(12) United States Patent
Chang et al.

(10) Patent No.: US 10,703,047 B2
(45) Date of Patent: Jul. 7, 2020

(54) THREE-DIMENSIONAL PRINTING METHOD (71) Applicants: XYZprinting, Inc., New Taipei (RW); Kinpo Electronics, Inc., New Taipei (TW)

(72) Inventors: Yu-Chuan Chang, New Taipei (TW); Bo-Yi Wu, New Taipei (TW); Yu-Ting Huang, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 126 days.

(21) Appl. No.: 15/831,401

(22) Filed: Dec. 5, 2017

(65) Prior Publication Data
US 2018/0311901 A1   Nov. 1, 2018

(30) Foreign Application Priority Data

Apr. 27, 2017   (CN) .......................... 2017 1 0286353

(51) Int. Cl.
| | | |
|---|---|---|
| *B29C 64/393* | (2017.01) | |
| *B29C 64/209* | (2017.01) | |
| *B33Y 10/00* | (2015.01) | |
| *B33Y 50/02* | (2015.01) | |

(Continued)

(52) U.S. Cl.
CPC .......... *B29C 64/393* (2017.08); *B29C 64/118* (2017.08); *B29C 64/209* (2017.08); *B33Y 10/00* (2014.12); *B33Y 30/00* (2014.12); *B33Y 50/02* (2014.12)

(58) Field of Classification Search
CPC ... B29C 64/393; B29C 66/118; B29C 64/209; B29C 64/386; B29C 64/106; B29C 48/255; B29C 48/2552; B29C 48/267; B29C 48/151; B29C 48/78–89;

(Continued)

(56) References Cited

U.S. PATENT DOCUMENTS

2015/0165688 A1   6/2015 Ho et al.
2015/0321434 A1*  11/2015 Sterman ................. B29D 35/12
                                                        264/255

(Continued)

OTHER PUBLICATIONS

Jonnybischof, Correlation of layer time & nozzle temp, Nov. 19, 2013, https://community.ultimaker.com/topic/3187-correlation-of-layer-time-nozzle-temp/ Retrieved Jun. 4, 2019 (Year: 2013).*

(Continued)

*Primary Examiner* — Abbas Rashid
*Assistant Examiner* — Adrianna N Konves
(74) *Attorney, Agent, or Firm* — JCIPRNET (57) ABSTRACT

A three-dimensional printing apparatus including a fusion nozzle and a control device is provided. The fusion nozzle is configured to heat a molding material at a heating temperature. The control device is coupled to the fusion nozzle. The control device is configured to control the fusion nozzle to perform a printing operation according to a slicing image. The control device determines the heating temperature of the fusion nozzle according to slicing contour information of a slicing object in the slicing image. In addition, a three-dimensional printing method is also provided.

2 Claims, 4 Drawing Sheets

(51) Int. Cl.
*B33Y 30/00* (2015.01)
*B29C 64/118* (2017.01)

(58) Field of Classification Search
CPC .... B29C 48/90–908; B29C 48/91–919; B33Y 10/00; B33Y 30/00; B33Y 50/02
See application file for complete search history.

(56) References Cited

U.S. PATENT DOCUMENTS

| | | | | |
|---|---|---|---|---|
| 2015/0328839 | A1* | 11/2015 | Willis | G05B 19/4099 |
| | | | | 700/98 |
| 2016/0236416 | A1* | 8/2016 | Bheda | B29C 64/386 |
| 2016/0266572 | A1* | 9/2016 | Chang | G05B 19/4099 |
| 2019/0381737 | A1* | 12/2019 | Sansare | B33Y 50/02 |

OTHER PUBLICATIONS

"Search Report of Europe Counterpart Application", dated Sep. 3, 2018, p. 1-p. 7.

* cited by examiner

Determining a heating temperature of the fusion nozzle according to slicing contour information of a slicing object in a slicing image — S610

Controlling the fusion nozzle to heat the molding material at the heating temperature, and controlling the fusion nozzle to perform the three-dimensional printing operation according to the slicing image — S620

FIG. 6

THREE-DIMENSIONAL PRINTING METHOD

CROSS-REFERENCE TO RELATED APPLICATION

This application claims the priority benefit of China application serial no. 201710286353.6, filed on Apr. 27, 2017. The entirety of the above-mentioned patent application is hereby incorporated by reference herein and made a part of this specification.

TECHNICAL FIELD

The disclosure relates to a printing apparatus, and more particularly, relates to a three-dimensional printing apparatus and a three-dimensional printing method.

BACKGROUND

With advances in computer-aided manufacturing (CAM), the manufacturing industries have developed a three-dimensional printing technology capable of rapidly fabricating products from an original design concept. The three-dimensional printing technology is in fact a collective term for a series of rapid prototyping (RP) techniques with the basic principle of laminate manufacturing, where a rapid prototyping machine forms cross-sectional shapes of a workpiece in the X-Y plane by ways of scanning, shift intermittently at a layer thickness in the Z coordinates so a 3D object can be eventually formed. The three-dimensional printing technology is applicable regardless of the geometric shapes and the RP technology produces excellent outputs in particular for complex parts, which saves efforts and processing time significantly. A digital 3D model designed by means of computer-aided design (CAD) software can be realistically presented in the least time.

During the process of printing the 3D object, the three-dimensional printing apparatus heats up a molding material and feeds out the melted molding material onto a platform so as to print out a slicing object in each layer. However, rips, cracks or deformation can occasionally occur on the 3D object completed by a common three-dimensional printing operation. Therefore, finding a way to develop a three-dimensional printing apparatus and a three-dimensional printing method for providing favorable printing quality is one of the important issues to be addressed.

SUMMARY

The disclosure is directed to a three-dimensional printing apparatus and a three-dimensional printing method, which are capable of effectively printing out 3D models with various contours while providing favorable printing quality.

A three-dimensional printing apparatus of the disclosure includes a fusion nozzle and a control device. The fusion nozzle is configured to heat a molding material at a heating temperature. The control device is coupled to the fusion nozzle. The control device is configured to control the fusion nozzle to perform a printing operation according to a slicing image. The control device determines the heating temperature of the fusion nozzle according to slicing contour information of a slicing object in the slicing image.

In an embodiment of the disclosure, the slicing contour information is an outermost-ring contour perimeter of the slicing object.

In an embodiment of the disclosure, the control device sets the heating temperature as a first temperature value when determining that the outermost-ring contour perimeter of the slicing object in the slicing image is greater than a first threshold.

In an embodiment of the disclosure, the control device sets the heating temperature as a second temperature value when determining that the outermost-ring contour perimeter of the slicing object in the slicing image is less than or equal to the first threshold. The first temperature value is greater than the second temperature value.

In an embodiment of the disclosure, the control device sets the heating temperature as a second temperature value when determining that the outermost-ring contour perimeter of the slicing object in the slicing image is less than or equal to a second threshold. The first threshold is greater than the second threshold, and the first temperature value is greater than the second temperature value.

In an embodiment of the disclosure, the control device sets the heating temperature as a third temperature value when determining that the outermost-ring contour perimeter is between the first threshold and the second threshold. The third temperature value is between the first temperature value and the second temperature value.

In an embodiment of the disclosure, the molding material is an ABS resin material.

A three-dimensional printing method of the disclosure is adapted to control a fusion nozzle to perform a printing operation. The three-dimensional printing method includes the following steps of: determining a heating temperature of the fusion nozzle according to slicing contour information of a slicing object in a slicing image; and controlling the fusion nozzle to heat the molding material at the heating temperature, and controlling the fusion nozzle to perform the printing operation according to the slicing image.

In an embodiment of the disclosure, the slicing contour information is an outermost-ring contour perimeter of the slicing object.

In an embodiment of the disclosure, the step of determining the heating temperature of the fusion nozzle according to the slicing contour information of the slicing object in the slicing image includes: setting the heating temperature as a first temperature value when determining that the outermost-ring contour perimeter of the slicing object in the slicing image is greater than a first threshold.

In an embodiment of the disclosure, the step of determining the heating temperature of the fusion nozzle according to the slicing contour information of the slicing object in the slicing image further includes: setting the heating temperature as a second temperature value when determining that the outermost-ring contour perimeter of the slicing object in the slicing image is less than or equal to the first threshold. The first temperature value is greater than the second temperature value.

In an embodiment of the disclosure, the step of determining the heating temperature of the fusion nozzle according to the slicing contour information of the slicing object in the slicing image further includes: setting the heating temperature as a second temperature value when determining that the outermost-ring contour perimeter of the slicing object in the slicing image is less than or equal to a second threshold. The first threshold is greater than the second threshold, and the first temperature value is greater than the second temperature value.

In an embodiment of the disclosure, the step of determining the heating temperature of the fusion nozzle according to the slicing contour information of the slicing object in the slicing image further includes: setting the heating temperature as a third temperature value when determining that the outermost-ring contour perimeter is between the first threshold and the second threshold. The third temperature value is between the first temperature value and the second temperature value.

In an embodiment of the disclosure, the molding material is an ABS resin material.

Based on the above, the disclosure provides a three-dimensional printing apparatus and a three-dimensional printing method, which can determine the heating temperature for the molding material according to the contour perimeter of the slicing object in the slicing image, such that 3D models with various contour sizes can be effectively printed to thereby provide favorable printing quality.

To make the above features and advantages of the disclosure more comprehensible, several embodiments accompanied with drawings are described in detail as follows.

DETAILED DESCRIPTION

The term "coupled (or connected)" used in this specification (including claims) may refer to any direct or indirect connection means. Moreover, elements/components/steps with same reference numerals represent same or similar parts in the drawings and embodiments. Elements/components/steps with the same reference numerals or names in different embodiments may be cross-referenced.

Figure 1:
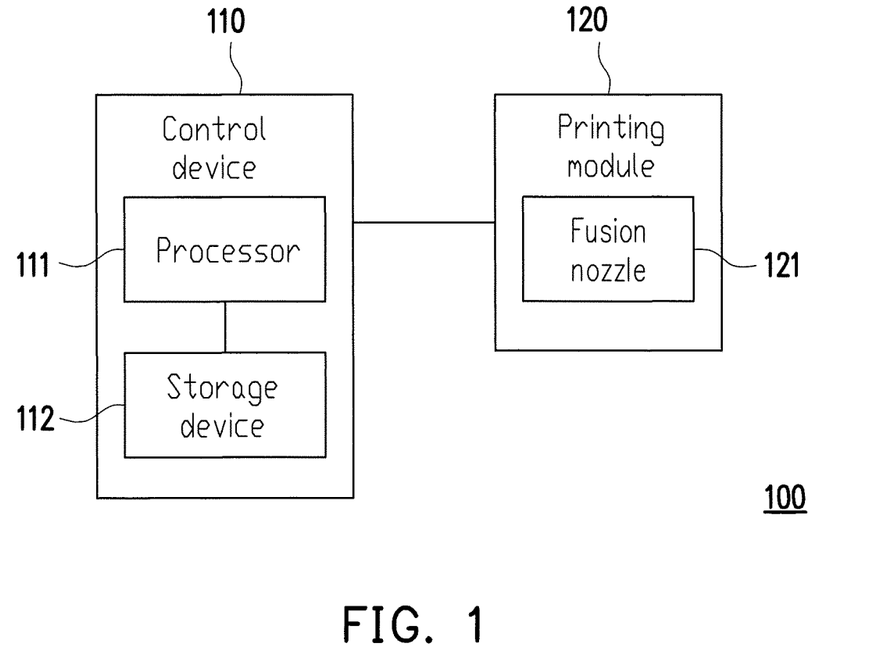
FIG. 1 is a block diagram illustrating a three-dimensional printing apparatus according to an embodiment of the disclosure.

FIG. 1 is a block diagram illustrating a three-dimensional printing apparatus according to an embodiment of the disclosure. With reference to FIG. 1, a three-dimensional printing apparatus 100 includes a control device 110 and a printing module 120. In the present embodiment, the control device 110 includes a processor 111 and a storage device 112. The processor 111 is coupled to the storage device 112. The storage device 112 is configured to store a plurality of modules and 3D model information, where the modules is configured to process, analyze and calculate the 3D model information and is configured to drive the printing module 120. The processor 111 is configured to read the modules and the 3D model information in the storage device 112 and drive the printing module 120 to execute a printing operation. More specifically, the control device 110 may be a device with computing functions such as a computer device, including a notebook computer, a tablet computer or a desktop computer. However, the disclosure is not intended to limit the type of the control device 110. The control device 110 is coupled to the printing module 120. The control device 110 can edit and process a 3D model of a 3D object and transmits related 3D model information to the printing module 120 so the printing module 120 can print out the 3D object according to the 3D model information. In the present embodiment, the 3D model may be a 3D digital image file, which can be constructed by the control device 110 using computer-aided design (CAD) or animation modeling software. Also, the control device 110 can perform a slicing process on the 3D model to obtain a plurality of slicing images associated with a plurality of slicing objects. The printing module 120 can then sequentially print out the 3D model for each layer according to the 3D model information corresponding to the slicing objects in the slicing image so the complete 3D object can be eventually formed.

In the present embodiment, the processor 111 may be, for example, a central processing unit (CPU), or other programmable devices for general purpose or special purpose, such as a microprocessor and a digital signal processor (DSP), a programmable controller, an application specific integrated circuit (ASIC), a programmable logic device (PLD) or other similar devices or a combination of above-mentioned devices.

In the present embodiment, the storage device 112 is configured to store data, and may be a buffer memory, an internal storage medium, an external storage medium, a storage device of other types, or a combination of the above. For example, the buffer memory includes a random access memory, a read-only memory or other similar devices. For example, the internal storage medium includes a hard disk drive (HDD), a solid state disk, a flash storage device or other similar devices. For example, the external storage device includes an external HDD, a USB drive, a cloud disk or other similar devices.

In the present embodiment, the printing module 120 includes a fusion nozzle 121. The fusion nozzle 121 is configured to melt down a molding material, and feed out the melted molding material onto a platform for a three-dimensional printing operation. In the present embodiment, the printing module 120 may further include other components configured to complete the three-dimensional printing operation together with the fusion nozzle 121 (e.g., a controller, a feeding pipe, a linkage mechanism for the fusion nozzle, etc.), and enough teaching, suggestion, and implementation illustration for these related components can be obtained with reference to common knowledge in the related art, which is not repeated hereinafter.

Figure 2:
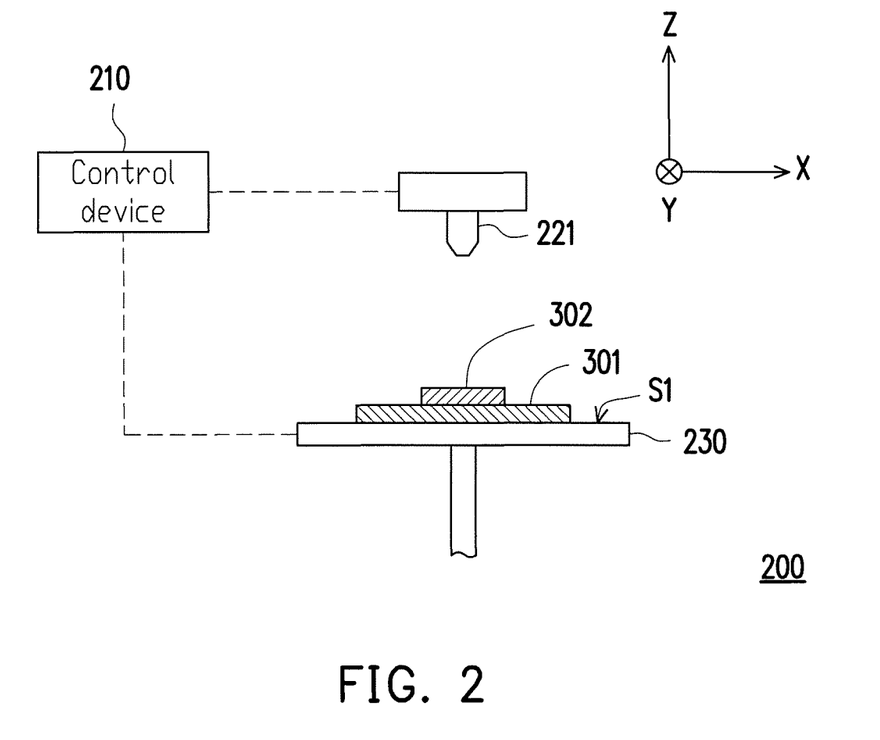
FIG. 2 is a schematic diagram illustrating a scenario for a three-dimensional printing apparatus according to an embodiment of the disclosure.

FIG. 2 is a schematic diagram illustrating a scenario for a three-dimensional printing apparatus according to an embodiment of the disclosure. With reference to FIG. 2, when a three-dimensional printing operation is performed by a three-dimensional printing apparatus 200, a fusion nozzle 221 feeds out a melted molding material on a carrying surface S1 of a platform 230, and starts printing layer-by-layer from the bottom layer of the 3D model. In the present embodiment, a control device 210 can control a moving direction of a printing nozzle according to information in a slicing image. For example, the fusion nozzle 221 can be controlled to move along the X-Y plane and along a normal direction of the X-Y plane (i.e., in the Z-axis direction) so that the fusion nozzle 221 can form a 3D object 301 and a 3D object 302 cured above the carrying surface S1 of the platform 230.

It should be noted that, the molding material in each embodiment of the disclosure may be an ABS (Acrylonitrile Butadiene Styrene) resin material, which is a thermal meltable high-molecular material. A melting point of the ABS resin material may fall between 210° C. and 240° C., but the disclosure is not limited thereto. In an embodiment, the molding material in each embodiment of the disclosure may also be a PLA (Polylactic Acid) or other thermal melt-able high-molecular materials. Further, the control device 210 of the present embodiment can determine a heating temperature of the fusion nozzle 221 according to slicing contour information of a slicing object in a slicing image. Herein, the slicing contour information is an outermost-ring contour perimeter of the slicing object, but the disclosure is not limited thereto. In an embodiment, the slicing contour information may also be related slicing information such as a slicing area or a contour maximal diameter of the slicing object. It should be noted that, the slicing object described in each embodiment of the disclosure may have one or more contours depending on different forms of the object, and the outermost-ring contour perimeter generally refers to a contour among a plurality of contours that is furthest away from a structural center of the slicing object. That is to say, in terms of one specific slicing object, the slicing contour information can reflect a longest pathway for feeding out the melted molding material among one or more contours constituting that specific slicing object. A relation between the heating temperature of the fusion nozzle 221 and the slicing contour information is described below with reference to FIG. 3, FIG. 4A and FIG. 4B.

Figure 3:
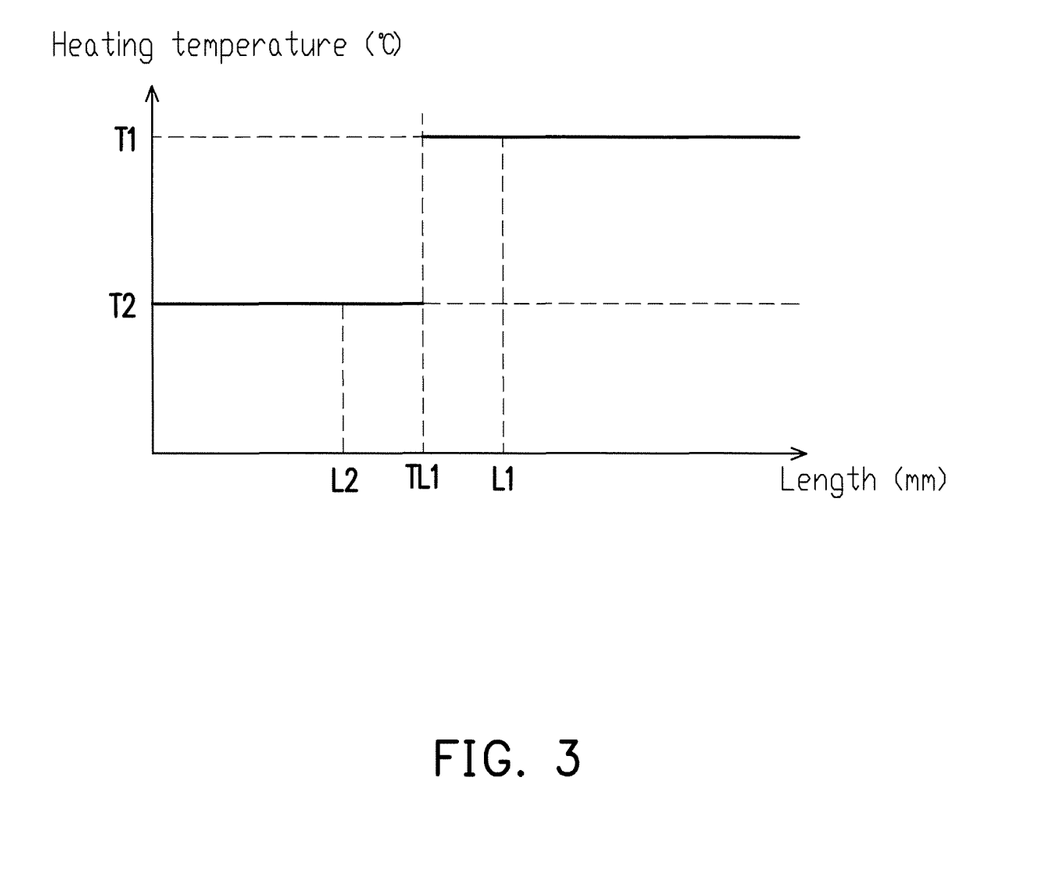
FIG. 3 is a chart illustrating a relation between a contour perimeter and a heating temperature according to an embodiment of the disclosure.
Figure 4A:
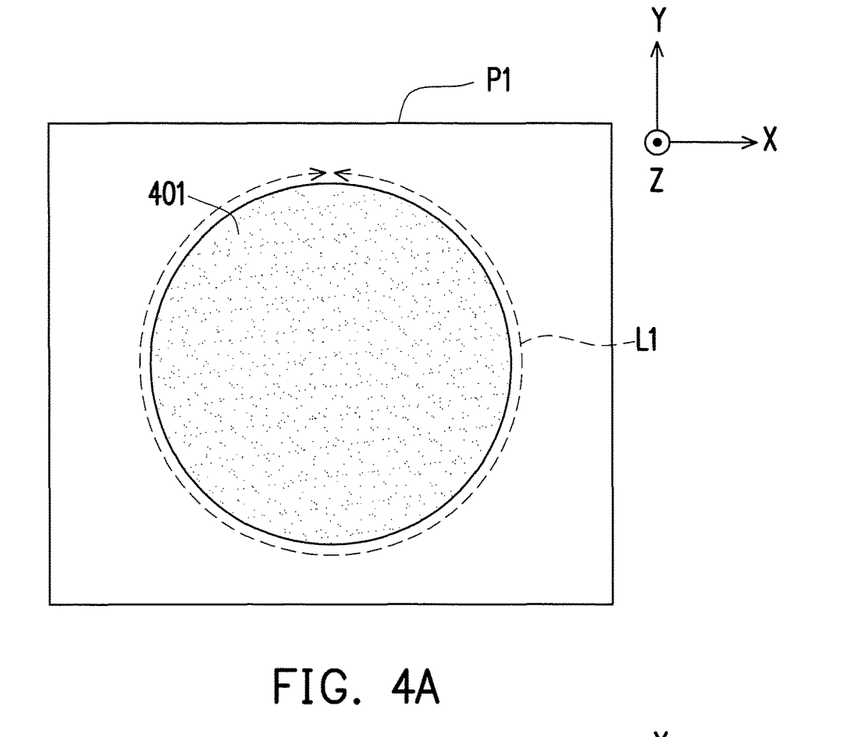
FIG. 4A and FIG. 4B are schematic diagrams illustrating slicing images according to an embodiment of the disclosure.
Figure 4B:
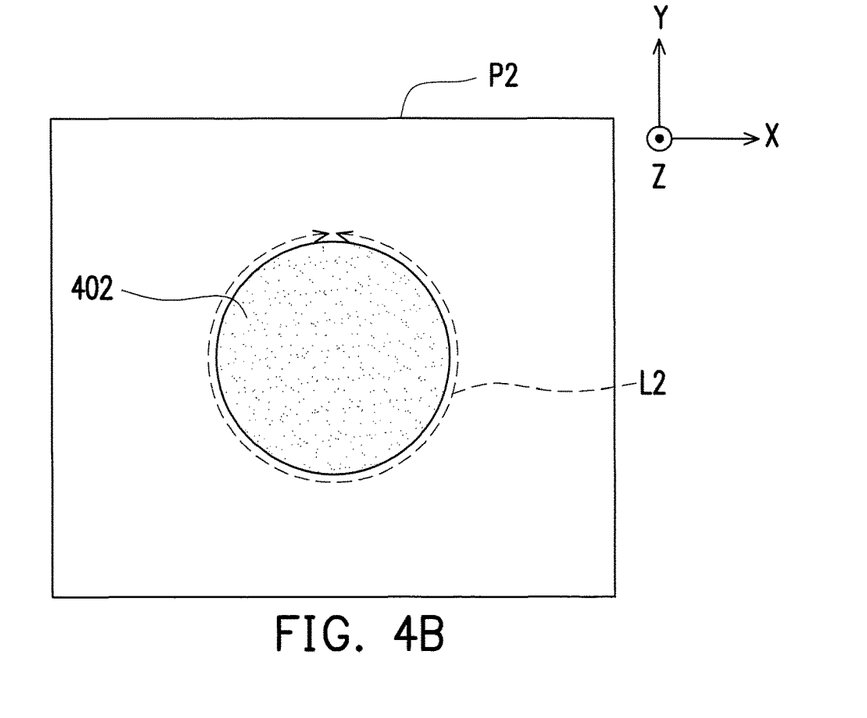

FIG. 3 is a chart illustrating a relation between a contour perimeter and a heating temperature according to an embodiment of the disclosure. FIG. 4A and FIG. 4B are schematic diagrams illustrating slicing images according to an embodiment of the disclosure. For instance, referring to FIG. 2, FIG. 3 and FIG. 4A, when a 3D object 301 is to be printed by the three-dimensional printing apparatus 200, the control device 210 controls the fusion nozzle 221 to perform the three-dimensional printing operation on the carrying surface S1 of the platform 230 according to a slicing image P1 of FIG. 4A. The control device 210 calculates an outermost-ring contour perimeter L1 of a slicing object 401 in the slicing image P1, and sets the heating temperature for heating the molding material as a first temperature value T1 when determining that the outermost-ring contour perimeter L1 of the slicing object 401 is greater than a first threshold TL1 so as to feed out the melted molding material to be cured and formed into the 3D object 301. In other words, if the outermost-ring contour perimeter L1 of the slicing object 401 is relatively great, the three-dimensional printing apparatus 200 heats the molding material with the heating temperature being higher. Accordingly, the 3D object 301 can have higher fluidity and extended curing time, so as to prevent the 3D object 301 from cracks or deformation after being cured.

With reference to FIG. 2, FIG. 3 and FIG. 4B, when a 3D object 302 is to be printed by the three-dimensional printing apparatus 200, the control device 210 controls the fusion nozzle 221 to perform the three-dimensional printing operation on the carrying surface S1 of the platform 230 according to a slicing image P2 of FIG. 4B. The control device 210 calculates an outermost-ring contour perimeter L2 of a slicing object 402 in the slicing image P2, and sets the heating temperature for heating the molding material as a second temperature value T2 when determining that the outermost-ring contour perimeter L2 of the slicing object 402 is less than or equal to the first threshold TL1 so as to feed out the melted molding material to be cured and formed into the 3D object 302. In other words, if the outermost-ring contour perimeter L1 of the slicing object 402 is relatively small, the three-dimensional printing apparatus 200 heats up the molding material with the heating temperature being lower, so as to properly print out the 3D object 302.

In other words, the three-dimensional printing apparatus 200 of the present embodiment can determine the heating temperature of the fusion nozzle 221 for heating the molding material by determining the size of the outermost-ring contour perimeter of the 3D object. Also, when the three-dimensional printing operation is to be performed by the three-dimensional printing apparatus 200 of the present embodiment layer-by-layer, the control device 210 determines the slicing image for each layer and dynamically raises or lowers the heating temperature of the fusion nozzle 221, so as to effectively print out the 3D object with favorable quality. Moreover, the first threshold TL1 of the present embodiment may be, for example, 3.75 mm and the first temperature value T1 and the second temperature value T2 may be, for example, 240° C. and 210° C. respectively. However, the disclosure is not limited to the above. In an embodiment, the first threshold TL1, the first temperature value T1 and the second temperature value T2 may be determined depending on different molding material characteristics or different three-dimensional printing requirements. Further, in the slicing image P1 and the slicing image P2 of the present embodiment, contour shapes of the slicing object 401 and the slicing object 402 are not limited by those illustrated in FIG. 4A and FIG. 4B. The contour shapes of the slicing object 401 and the slicing object 402 in the slicing image P1 and the slicing image P2 may be any shapes, which are not particularly limited by the disclosure.

Figure 5:
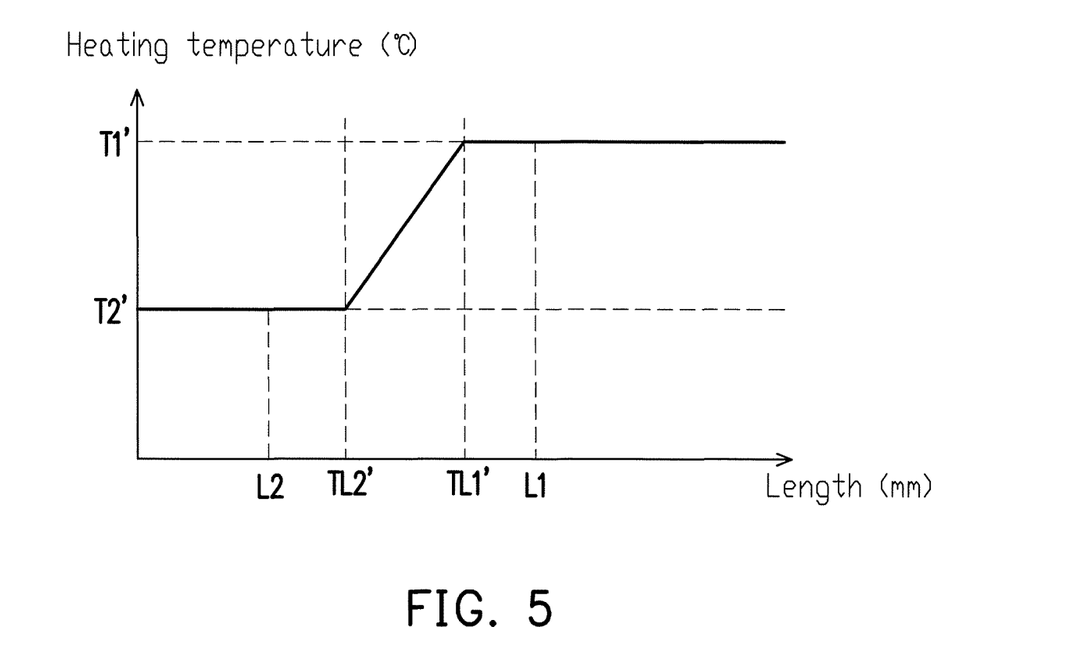
FIG. 5 is a chart illustrating a relation between a contour perimeter and a heating temperature according to another embodiment of the disclosure.

FIG. 5 is a chart illustrating a relation between a contour perimeter and a heating temperature according to another embodiment of the disclosure. In the present embodiment, the control device 210 may also determine the heating temperature for the molding material according to a plurality of thresholds. For instance, referring to FIG. 2, FIG. 4A and FIG. 5, when the 3D object 301 is to be printed by the three-dimensional printing apparatus 200, the control device 210 controls the fusion nozzle 221 to perform the three-dimensional printing operation on the carrying surface S1 of the platform 230 according to the slicing image P1 of FIG. 4A. The control device 210 calculates the outermost-ring contour perimeter L1 of the slicing object 401 in the slicing image P1, and sets the heating temperature for heating the molding material as a first temperature value T1' when determining that the outermost-ring contour perimeter L1 of the slicing object 401 is greater than a first threshold TL1' so as to feed out the melted molding material to be cured and formed into the 3D object 301. In other words, if the outermost-ring contour perimeter L1 of the slicing object 401 is relatively great, the three-dimensional printing apparatus 200 heats the molding material with the heating temperature being higher. Accordingly, the 3D object 301 can have higher fluidity and extended curing time, so as to prevent the 3D object 301 from cracks or deformation after being cured.

With reference to FIG. 2, FIG. 4B and FIG. 5, when the 3D object 302 is to be printed by the three-dimensional printing apparatus 200, the control device 210 controls the fusion nozzle 221 to perform the three-dimensional printing operation on the carrying surface S1 of the platform 230 according to the slicing image P2 of FIG. 4B. The control device 210 calculates the outermost-ring contour perimeter L2 of the slicing object 402 in the slicing image P2, and sets the heating temperature for heating the molding material as a second temperature value T2' when determining that the outermost-ring contour perimeter L2 of the slicing object 402 is less than or equal to a second threshold TL2' so as to feed out the melted molding material to be cured and formed into the 3D object 302. In other words, if the outermost-ring contour perimeter L1 of the slicing object 402 is relatively small, the three-dimensional printing apparatus 200 heats up the molding material with the heating temperature being lower, so as to properly print out the 3D object 302.

It should be noted that, in the present embodiment, if the control device 210 determines that the outermost-ring contour perimeter of the slicing object in the slicing image is between the first threshold TL1' and the second threshold TL2', the control device 210 can determine the heating temperature for the molding material according to a linear relation. As shown in FIG. 5, a relation with the heating temperature between the first threshold TL1' and the second threshold TL2' is a straight line with a positive slope. In other words, the control device 210 obtains a third temperature value corresponding to the outermost-ring contour perimeter of the slicing object such that the fusion nozzle 221 heats the molding material at the heating temperature being the third temperature value. However, in an embodiment, the relation with the heating temperature between the first threshold TL1' and the second threshold TL2' may also be determined depending on different molding material characteristics or different three-dimensional printing requirements. For example, the relation with the heating temperature between the first threshold TL1' and the second threshold TL2' may also be line segments in form of a rising ladder or a curve line instead of being limited by the straight line shown in FIG. 5. In other words, the three-dimensional printing apparatus 200 of the present embodiment can flexibly determine the heating temperature of the fusion nozzle 221 for heating the molding material through multiple determination conditions (said thresholds).

In addition, the first threshold TL1' and the second threshold TL2' may be 30 mm and 37.5 mm respectively. Also, the first temperature value T1' and the second temperature value T2' may be, for example, 240° C. and 210° C. respectively, but the disclosure is not limited thereto. In an embodiment, the first threshold TL1', the second threshold TL2', the first temperature value T1' and the second temperature value T2' may be determined depending on different molding material characteristics or different three-dimensional printing requirements.

Figure 6:
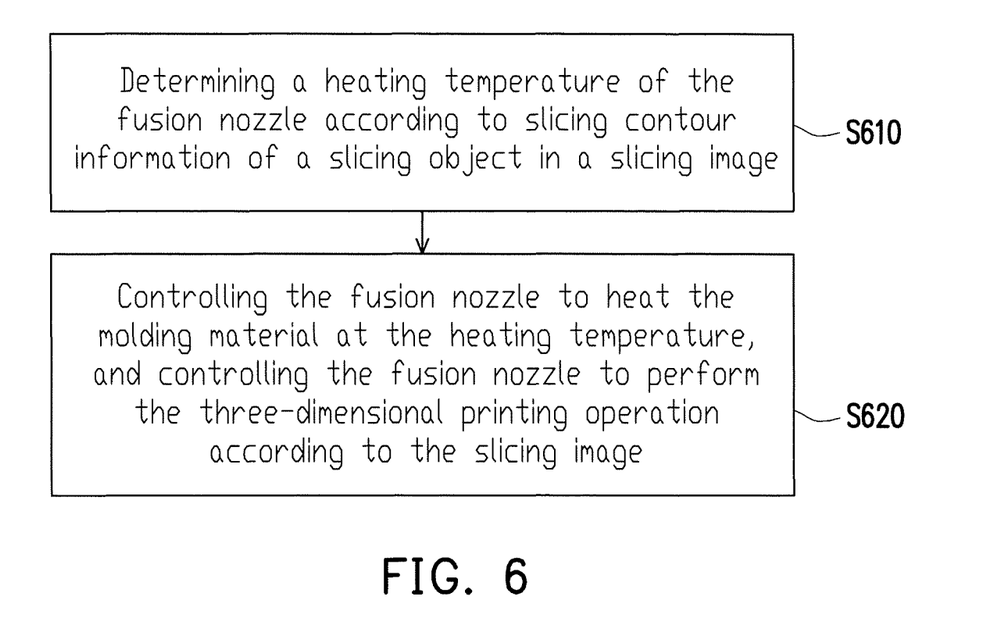
FIG. 6 is a flowchart illustrating a three-dimensional printing method according to an embodiment of the disclosure.

FIG. 6 is a flowchart illustrating a three-dimensional printing method according to an embodiment of the disclosure. Referring to FIG. 1 and FIG. 6, the three-dimensional printing method of the present embodiment is at least applicable to the three-dimensional printing apparatus 100 in FIG. 1. In step S610, the control device 110 determines a heating temperature of the fusion nozzle according to slicing contour information of a slicing object in a slicing image. In step S620, the control device 110 controls the fusion nozzle to heat the molding material at the heating temperature, and controls the fusion nozzle to perform the three-dimensional printing operation according to the slicing image. Accordingly, the three-dimensional printing apparatus 100 of the present embodiment can heat the molding material at the proper heating temperature, so the 3D object with favorable quality can be printed.

Further, enough teaching, suggestion, and implementation illustration related to implementation details and related device features of the three-dimensional printing method of the present embodiment can be obtained form the descriptions in each embodiment of FIG. 1 to FIG. 5 above, which are not repeated hereinafter.

In summary, with the three-dimensional printing apparatus and the three-dimensional printing method in each embodiment of the disclosure, the heating temperature for the molding material is decided by determining the outermost-ring contour perimeter of the slicing object in the slicing image and using at least one threshold such that the heating temperature of the fusion nozzle can be dynamically adjusted. Accordingly, the three-dimensional printing apparatus and the three-dimensional printing method in each embodiment of the disclosure can effectively prevent rips, cracks or deformation—as caused by different thermal expansion and contraction degrees from the slicing object in each layer depending on size and shape of the slicing object in each layer—from occurring on the completed 3D object. Specifically, during the process of printing the 3D object, the three-dimensional printing apparatus can heat a molding material and feed out the fused molding material onto the platform so as to print out the slicing object in each layer. Nonetheless, because size and shape of the slicing object in each layer may be different from those of the others, the slicing object in each layer may have a different printing time. Moreover, during the process of heating the molding material, because the slicing object in each layer may have variation in volume due to thermal expansion and contraction and the printing time may be different in terms of length for the slicing object in each layer, there can be different thermal expansion and contraction degrees for the slicing objects from each layer depending on size and shape of the slicing object in each layer. That is to say, rips, cracks or deformation may occur on the 3D object completed by the common three-dimensional printing operation. The three-dimensional printing apparatus and the three-dimensional printing method in each embodiment are capable of preventing aforesaid issues as well as the possible defeats caused by the issues from affecting printed products. As a result, the three-dimensional printing apparatus and the three-dimensional printing method in each embodiment are able to provide favorable printing quality when printing the 3D model with contours in various sizes and shapes.

It will be apparent to those skilled in the art that various modifications and variations can be made to the disclosed embodiments. It is intended that the specification and examples be considered as exemplary only, with a true scope of the present disclosure being indicated by the following claims and their equivalents.

The invention claimed is:

1. A three-dimensional printing method, adapted to control a fusion nozzle for heating a molding material and performing a three-dimensional printing operation, wherein the three-dimensional printing method comprises:
   determining a heating temperature of the fusion nozzle according to slicing contour information of a slicing object in a slicing image; and
   controlling the fusion nozzle to heat the molding material at the heating temperature, and controlling the fusion nozzle to perform the three-dimensional printing operation according to the slicing image,
   wherein the slicing contour information is an outermost-ring contour perimeter of the slicing object,
   wherein the step of determining the heating temperature of the fusion nozzle according to the slicing contour information of the slicing object in the slicing image comprises:
   setting the heating temperature as a first temperature value when determining that the outermost-ring contour perimeter of the slicing object in the slicing image is greater than a first threshold, and for the outermost-ring contour perimeter of the slicing object greater than the first threshold, the heating temperature is kept constant at the first temperature value, setting the heating temperature as a second temperature value when determining that the outermost-ring contour perimeter of the slicing object in the slicing image is less than or equal to a second threshold, wherein the first threshold is greater than the second threshold, and the first temperature value is greater than the second temperature value, and for the outermost-ring contour perimeter of the slicing object in the slicing image is less than or equal to the second threshold, the heating temperature is kept constant at the second temperature value, and setting the heating temperature according to a linear relation between the heating temperature and the outermost-ring contour perimeter when the outermost-ring contour perimeter is less than or equal to the first threshold and greater than the second threshold.

2. The three-dimensional printing method according to claim 1, wherein the molding material is an ABS resin material.

\* \* \* \* \*

UNITED STATES PATENT AND TRADEMARK OFFICE
CERTIFICATE OF CORRECTION

Page 1 of 1

PATENT NO. : 10,703,047 B2
APPLICATION NO. : 15/831401
DATED : July 7, 2020
INVENTOR(S) : Yu-Chuan Chang et al.

It is certified that error appears in the above-identified patent and that said Letters Patent is hereby corrected as shown below:

On the Title Page

Item (71) Applicants: should read as:
XYZprinting, Inc., New Taipei (TW);
Kinpo Electronics, Inc., New Taipei (TW)

Signed and Sealed this
Eighth Day of September, 2020

Andrei Iancu
*Director of the United States Patent and Trademark Office*